(12) United States Patent
Charraud et al.

(10) Patent No.: US 12,434,069 B2
(45) Date of Patent: Oct. 7, 2025

(54) APPLICATOR WITH INDEXED BALL ROTATION CONFIGURED TO DISPENSES A SKIN FORMULA

(71) Applicant: L'Oreal, Paris (FR)

(72) Inventors: Gregoire Charraud, Jersey City, NJ (US); Casey Barbarino, San Anselmo, CA (US); Rafael Feliciano, New Providence, NJ (US)

(73) Assignee: L'Oreal, Paris (FR)

( * ) Notice: Subject to any disclaimer, the term of this patent is extended or adjusted under 35 U.S.C. 154(b) by 833 days.

(21) Appl. No.: 17/732,111

(22) Filed: Apr. 28, 2022

(65) Prior Publication Data

US 2023/0347165 A1 Nov. 2, 2023

(51) Int. Cl.
*A61N 5/06* (2006.01)
*A61M 35/00* (2006.01)

(52) U.S. Cl.
CPC ......... *A61N 5/0616* (2013.01); *A61M 35/003* (2013.01); *A61M 2205/13* (2013.01); *A61M 2205/3327* (2013.01); *A61M 2205/3592* (2013.01); *A61N 2005/0626* (2013.01); *A61N 2005/0644* (2013.01); *A61N 2005/0652* (2013.01)

(58) Field of Classification Search
CPC .......... A61N 5/0616; A61N 2005/0626; A61N 2005/0644; A61N 2005/0652; A61M 35/003; A61M 2205/13; A61M 2205/3327; A61M 2205/3592
See application file for complete search history.

(56) References Cited

U.S. PATENT DOCUMENTS

| | | | |
|---|---|---|---|
| 10,034,530 B2* | 7/2018 | Casasanta, III | ........ A45D 33/32 |
| 10,076,646 B2 | 9/2018 | Casasanta, III et al. | |
| 10,405,638 B2 | 9/2019 | Streeter et al. | |
| 10,842,241 B2 | 11/2020 | Casasanta, III | |
| 10,939,740 B2* | 3/2021 | Cheng | .................. A45D 40/262 |
| 11,457,719 B2 | 10/2022 | Streeter et al. | |
| 2016/0339218 A1* | 11/2016 | Casasanta, III | ..... A61M 35/003 |
| 2018/0168318 A1 | 6/2018 | Streeter et al. | |
| 2022/0107167 A1 | 4/2022 | Zeller et al. | |

FOREIGN PATENT DOCUMENTS

| | | |
|---|---|---|
| WO | 2014091035 A1 | 6/2014 |
| WO | 2015193303 A1 | 12/2015 |
| WO | 2016028933 A1 | 2/2016 |
| WO | 2016146778 A1 | 9/2016 |

OTHER PUBLICATIONS

Preliminary Search Report and Written Opinion mailed Feb. 20, 2023, issued in corresponding French Application No. 22 06395, filed Jun. 27, 2022, 6 pages.

* cited by examiner

*Primary Examiner* — Rebecca E Eisenberg
*Assistant Examiner* — Rachel O'Connell
(74) *Attorney, Agent, or Firm* — CHRISTENSEN O'CONNOR JOHNSON KINDNESS PLLC

(57) ABSTRACT

A system for applying a formula, the system including an applicator including a reservoir configured to hold a formula, a roller ball configured to apply the formula, and an accelerometer configured to map a surface as the roller ball rolls and applies the formula, an attachment configured to couple the applicator to a dispensing device and a dispensing device including a light source configured to apply light treatment, where the dispensing device is configured to accept the applicator.

19 Claims, 9 Drawing Sheets

APPLICATOR WITH INDEXED BALL ROTATION CONFIGURED TO DISPENSES A SKIN FORMULA

SUMMARY

The following describes a system for applying a formula to a surface, such as a skin care formula to a face with a specialized applicator and dispenser, and with an application on a communication device that helps visualize the surface and direct a user to apply the formula to one or more areas of the surface.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In one aspect, a system for applying a formula, the system including an applicator including a reservoir configured to hold a formula, a roller ball configured to apply the formula, an accelerometer configured to map a surface as the roller ball rolls and applies the formula and an attachment configured to couple the applicator to a dispensing device, and a dispensing device including a light source configured to apply light treatment, wherein the dispensing device is configured to accept the applicator is disclosed.

In another aspect, a method of using the skin care system described herein including rolling a roller ball of an applicator across a surface, applying formula from a reservoir in the applicator as the roller ball rolls, administering light treatment from a light source on a dispensing device as the roller ball rolls; and mapping the surface with an accelerometer in the applicator is disclosed.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

While illustrative embodiments have been illustrated and described, it will be appreciated that various changes can be made therein without departing from the spirit and scope of the invention.

An application ("app") disclosed below is configured to work in conjunction with a dispensing device and an applicator to apply a skin formula while simultaneously administering light therapy. In operation, the user may take a photo, or upload a photo, of their skin with a communication device, such as a smartphone camera, and open the app on the smartphone. In some embodiments, the app uses AI to analyze the user's skin, including but not limited to the overall skin condition, damage, color/pigmentation, acne, dark circles, or wrinkles. In some embodiments, the app also assesses environmental conditions that can influence the state of the user's skin. Example conditions include, but are not limited to, UV index, air quality, pollen, weather, temperature, and humidity.

In some embodiments, the app also assesses user inputs, including past skin treatment history. In some embodiments, the user can select specific skin concerns, such as moisture, pigmentation, UV protection, or acne. In some embodiments, the user selection may include a questionnaire, giving the user a set of prompts to respond to in order to determine what products would work best for their specific needs.

In some embodiments, a user can visualize a surface, such as their skin with the application while simultaneously applying a product. In some embodiments, the application will alert the user as to where they have not yet applied the formula, or as to areas that the user has historically applied the formula to.

In an embodiment, the app provides suggestions based only on the data analyzed in the photo, or in the application simultaneously as the user applies the formula. In an embodiment, the app provides suggestions based on suggestions provided to other users with similar skin features and environmental conditions.

With regular use, the AI platform can assess the user's past skin treatments with the dispensing device and applicator, helping users identify what is working, and indicating where the user should apply the formula in the applicator, or in areas where the user has forgotten or not yet applied the formula. The AI-powered system can optimize the efficacy of personalized formulas and the one or more areas to apply these formulas.

In some embodiments, the dispensing device is configured to accept an applicator containing a skin care formula. In some embodiments, the applicator slides into the dispensing device. In some embodiments, the applicator clicks into the dispensing device. In some embodiments, the applicator is RFID or QR coded so that the dispensing device can determine what formula is inside the applicator.

Figure 1A:
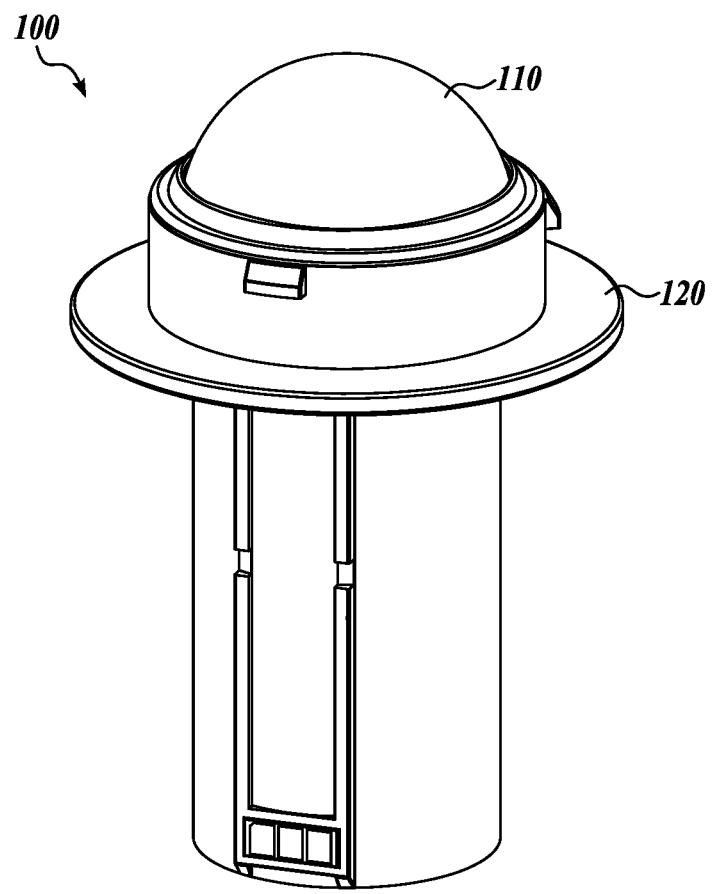
FIG. 1A is an example applicator, in accordance with the present technology.

FIG. 1A is an example applicator, in accordance with the present technology. The applicator 100 may include a roller ball 110, and an attachment 120.

Figure 1B:
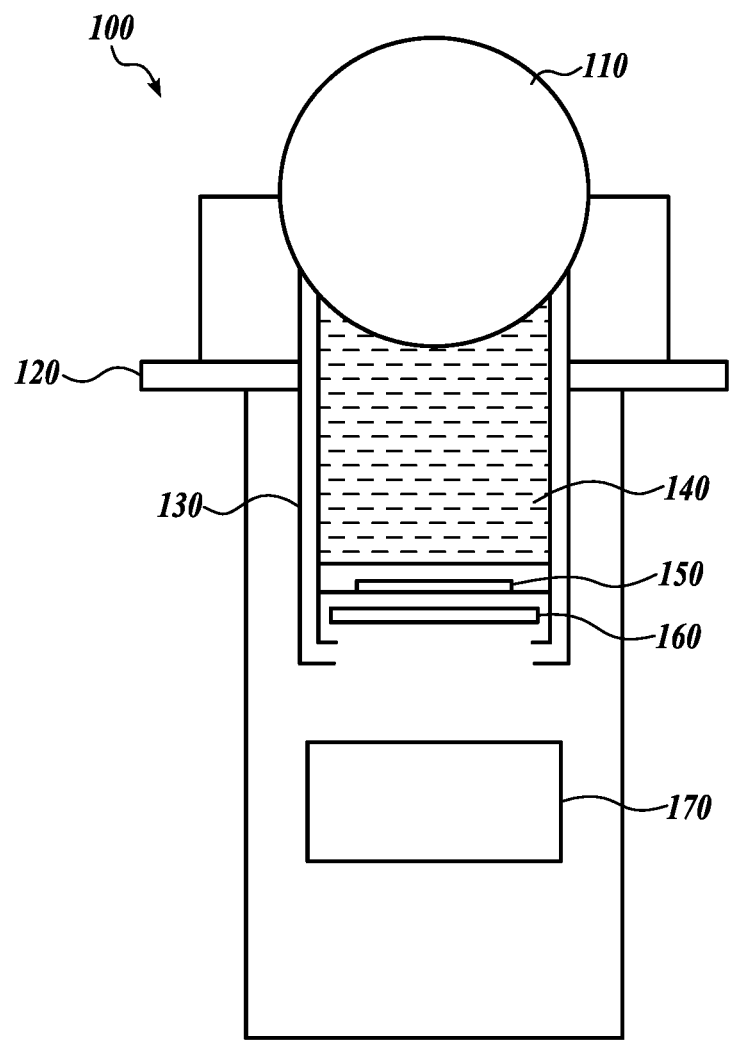
FIG. 1B is a cross section of the applicator of FIG. 1A, in accordance with the present technology.

The roller ball 110 may be configured to distribute and apply a formula located a reservoir inside the applicator 100 (as shown in FIG. 1B). In some embodiments, the roller ball 110 is plastic, but in other embodiments, the roller ball 110 may be glass or metal.

Figure 2:
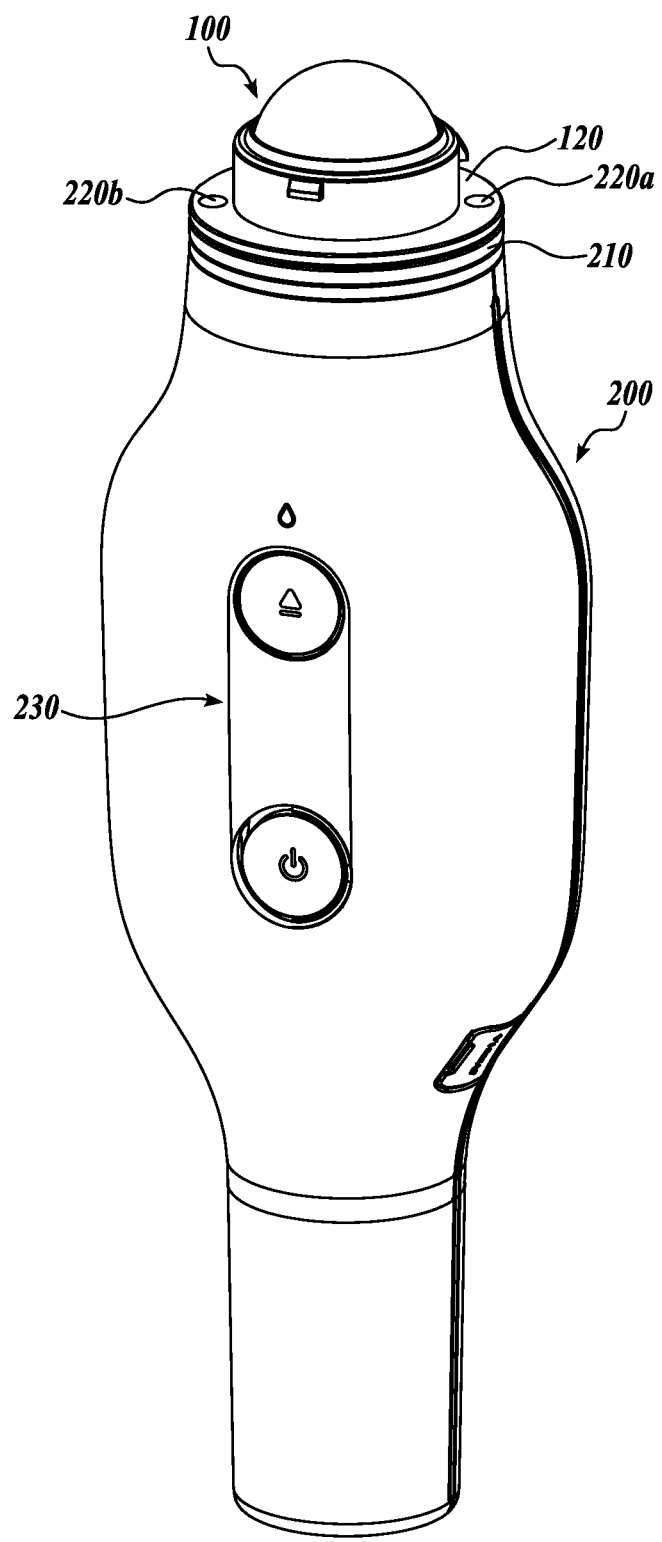
FIG. 2 is an example dispensing device with an example applicator attached, in accordance with the present technology.

In some embodiments, the applicator 100 also includes an attachment 120 configured to secure the applicator 100 into a dispensing device, such as the dispensing device 200 in FIG. 2. While the attachment 120 is illustrated as a disk shaped to couple to a dispensing device, the attachment 120 may take any form capable of securing the applicator to a dispensing device, including a threaded attachment, a magnet, or an attachment configured to snap into the dispensing device. In some embodiments, the attachment 120 is clear so that the dispensing device is visible through the attachment when the applicator 100 is attached to a dispensing device.

In operation, the applicator 100 can be placed inside a dispensing device (as shown in FIG. 2) and secured to the dispensing device with the attachment 120. The roller ball 110 can be rolled over a surface, such as a user's skin, to apply a formula.

FIG. 1B is a cross section of the applicator of FIG. 1A, in accordance with the present technology. The applicator 100 may include a roller ball 110, an attachment 120, a reservoir 130 configured to hold a formula 140, a piston 150, a microcontroller 160, and an accelerometer 170.

In some embodiments, the reservoir 130 is located inside the applicator 100, and is configured to hold a formula 140. In some embodiments, the formula 140 is a skin care formula. In some embodiments, the skin care formula is a moisturizer, a toner, an acne treatment, a wrinkle treatment, a fine line treatment, or a cosmetic. As the roller ball 110 rolls, formula 140 from the reservoir 130 is applied to a surface.

In some embodiments, the applicator 100 further includes a piston 150 configured to push the formula 140 towards the roller ball 110 as the formula is applied. In some embodiments, the piston 150 is directed by circuitry on a dispensing device or on the applicator 100 itself to push the formula 140 towards the roller ball 110.

In some embodiments, the applicator 100 includes a microcontroller 160 configured to identify the type of formula 140 inside the applicator 100 to a dispensing device. The microcontroller 160 may be used to identify any number of things about the formula 140 or applicator 100, including the amount of formula 140 inside the applicator 100, the expiration date of the formula 140 inside the applicator 100, or when to replace the applicator.

Additionally, in some embodiments, the applicator 100 includes an accelerometer 170. In some embodiments, the accelerometer 170 is coupled to the roller ball 110. The accelerometer 170 may be configured to map a surface as the roller ball 110 rolls and applies the formula 140. In some embodiments, the accelerometer 170 is a 9-axis accelerometer. In some embodiments, as the roller ball 110 rolls, the accelerometer 170 tracks the location that the roller ball 110 is on a surface.

FIG. 2 is an example dispensing device 200 with an example applicator 100 attached, in accordance with the present technology. In some embodiments, the applicator 100 can be attached to a dispensing device 200. In some embodiments, the dispensing device includes an end 210, one or more light sources 220a, 220b, and an actuator 230. In some embodiments, the applicator 100 connects to the dispenser 200.

In some embodiments, the dispensing device 200 includes an end 210. The end 210 may be configured to be seen through the attachment 120 on the applicator 100. In some embodiments, the end 210 includes one or more light sources 220a, 220b configured to administer light treatment to a surface while the formula is being applied.

In some embodiments, the one or more light sources 220a, 220b are LEDs. In some embodiments, there are only two light sources 220a, 220b on the dispensing device. In some embodiments, a first light source 220a is configured to administer light therapy in a first wavelength. In some embodiments, a second light source 220b is configured to administer light therapy in a second wavelength. In some embodiments, the light therapy in the first wavelength and the light therapy in the second wavelength are administered simultaneously. In some embodiments, the light therapy happens simultaneously with the formula being applied.

In some embodiments, the dispensing device 200 includes one or more actuators 230. While the actuator 230 is illustrated as a button, the actuator 230 may be a switch, a capacitive touch type button, a dial, or the like. The actuator 230 may be configured to administer light therapy, apply the formula, or both.

In some embodiments, the dispensing device 200 also includes a contact-less chip reader (not pictured in FIG. 2) to read the microcontroller 160 on the applicator 100.

In operation, a user may place an applicator 100 into the dispensing device 200. When the actuator 230 is actuated, the formula is applied, the light therapy is administered, or both, simultaneously. A user may then apply the formula with the applicator 100.

Figure 3A:
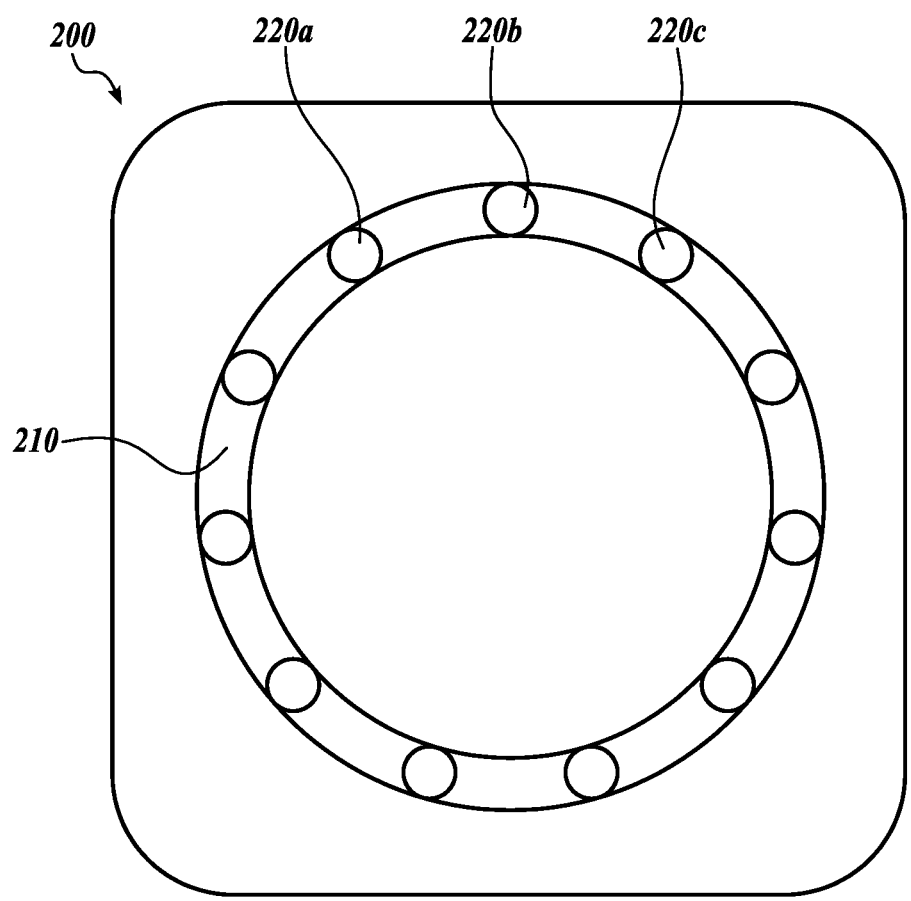
FIGS. 3A-3C are example dispensing device light sources for indicating a direction, in accordance with the present technology.
Figure 3B:
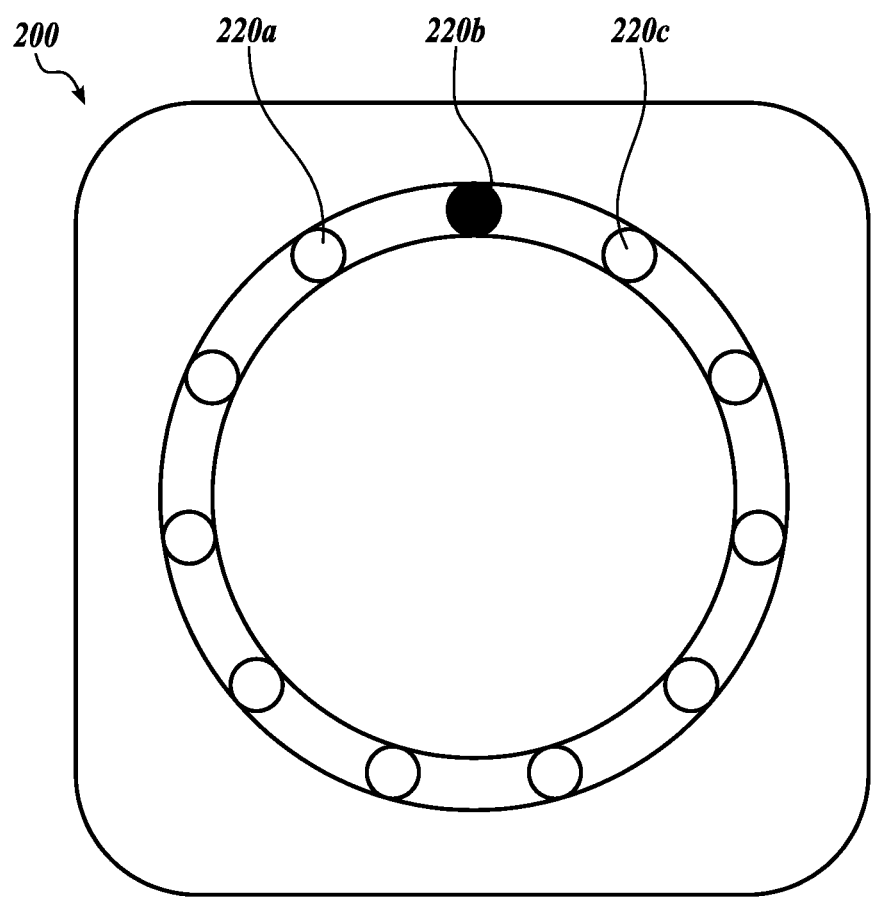
Figure 3C:
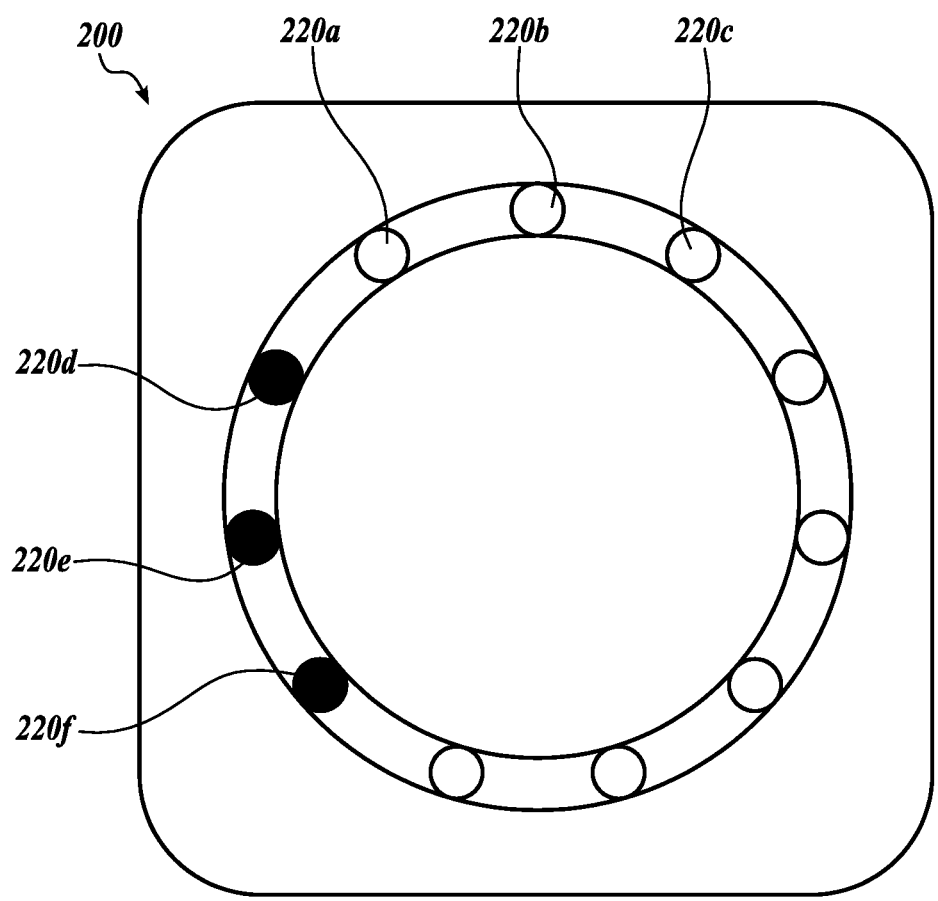

FIGS. 3A-3C are example dispensing device 200 light sources 220a, 220b, 220c for indicating a direction, in accordance with the present technology. In some embodiments, the dispensing device 200 directs a user to apply the formula in a particular direction. In some embodiments, the dispensing device 200 issues an alert through a tone or vibration, to direct the user to move in a direction. In some embodiments, the accelerometer 170 communicates with the dispensing device 200 and the plurality of light sources 220 to direct the user to move the applicator in a direction where they have not yet applied the formula and/or administered the light therapy. In some embodiments, the dispensing device stores a user history of use of the dispensing device. The user history may also inform the direction the dispensing device 200 suggests to the user.

In some embodiments, the dispensing device 200 further includes a plurality of light sources 220a, 220b, 220c disposed in a ring around the end 210. In some embodiments, the plurality of light sources 220a, 220b, 220c are configured to administer light therapy.

FIG. 3A shows a top-down perspective of a dispensing device 200 with a plurality of light sources 220a, 220b, 220c, located in a ring around the end 210. In FIG. 3A, the plurality of light sources 220a, 220b, 220c are all turned off.

In FIG. 3B, light source 220b is turned on. In some embodiments, the plurality of light sources 220a, 220b, 220c are further configured to suggest that the user move the applicator in a particular direction. As shown in FIG. 3B, a single light source, such as 220b, ma indicate the direction. Accordingly, FIG. 3B shows the dispensing device 200 indicating to the user that the user should move the dispensing device 200 upwards, i.e., towards 220b.

In FIG. 3C, light sources 220d, 220e, and 220f are turned on. In some embodiments, more than one of the light sources 220 are turned on to indicate what direction the user should move the applicator. As illustrated in FIG. 3C, three light sources 220d, 220e, and 220f indicate that the user should move the dispensing device 200 (and therefore the connected applicator) left, i.e., towards the light sources 220d, 220e, and 220f.

Figure 4:
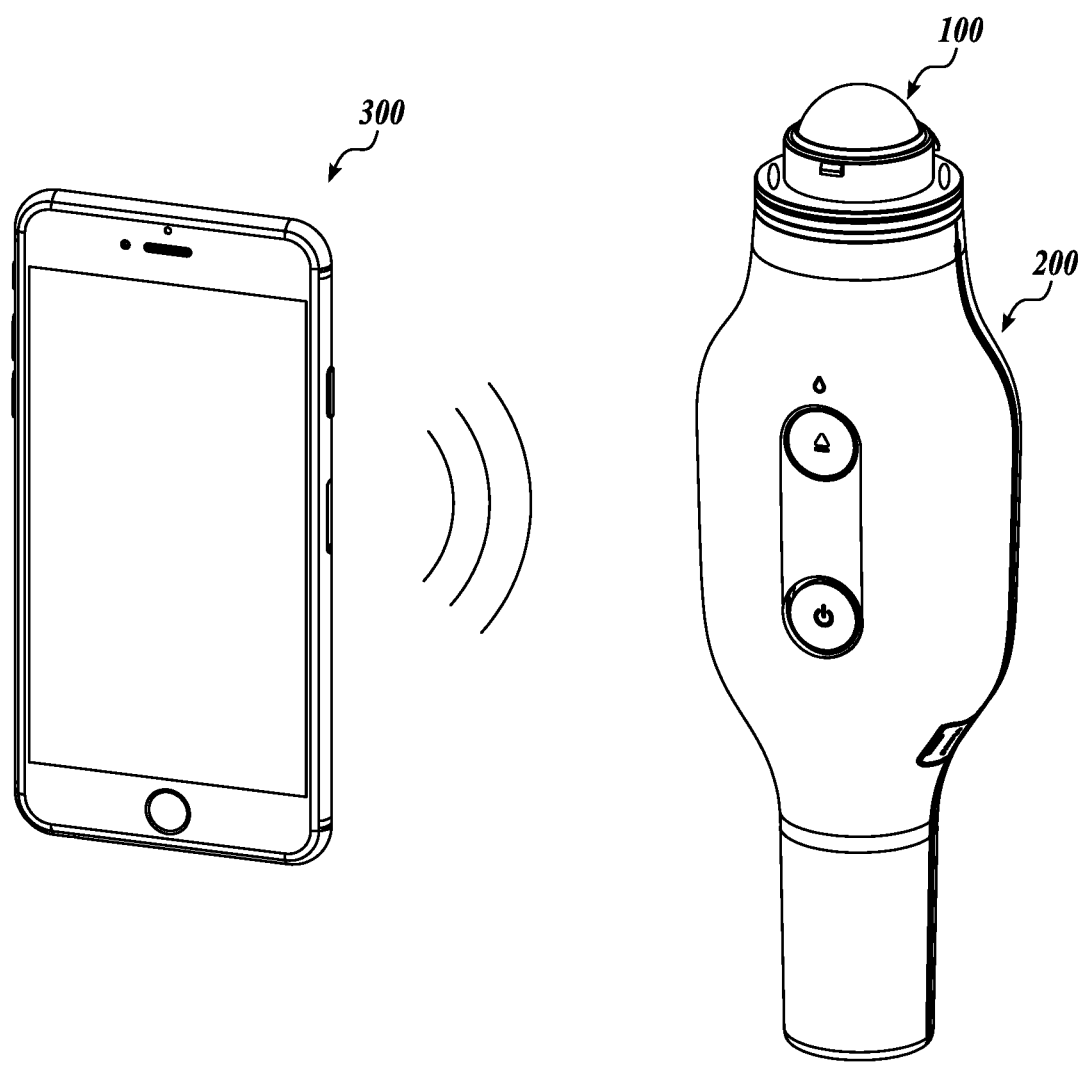
FIG. 4 is an example skin care system, in accordance with the present technology.

FIG. 4 is an example skin care system, in accordance with the present technology. In some embodiments, the system further includes a communication device 300 communicatively coupled to the dispensing device 200. Optionally, the system may further include one or more external servers which are implemented as part of a cloud-computing environment.

The communication device 300 may be a personal computer (PC), a laptop computer, a PDA (Personal Digital Assistants), a smart phone, a tablet device, a UMPC (Ultra Mobile Personal Computer), a netbook, or a notebook type personal computer. In the below examples, the connected device 300 is assumed to be a smartphone, such as an Apple iPhone.

The communication device 300 is capable of performing wireless communication with the dispensing device 200 by way of a wireless communication interface circuitry on the dispensing device 200. However, communication device 300 is also capable of having a wired connection to the dispensing device 200 by way of a USB interface on the apparatus 100. Additionally, each device, including the applicator 100, may communicate with each other and the external one or more devices through an internet connection via an 802.11 wireless connection to a wireless internet access point, or a physical connection to the internet access point, such as through an Ethernet interface. Each connected communication device 300 is capable of performing wireless communication with other devices, such as through a Bluetooth connection or other wireless means as well.

The communication device 300 is configured to receive information from a user for use in applying the formula and/or light therapy that will be used by the applicator 100 and the dispensing device 200 to apply the formula and/or administer light therapy.

Figure 5:
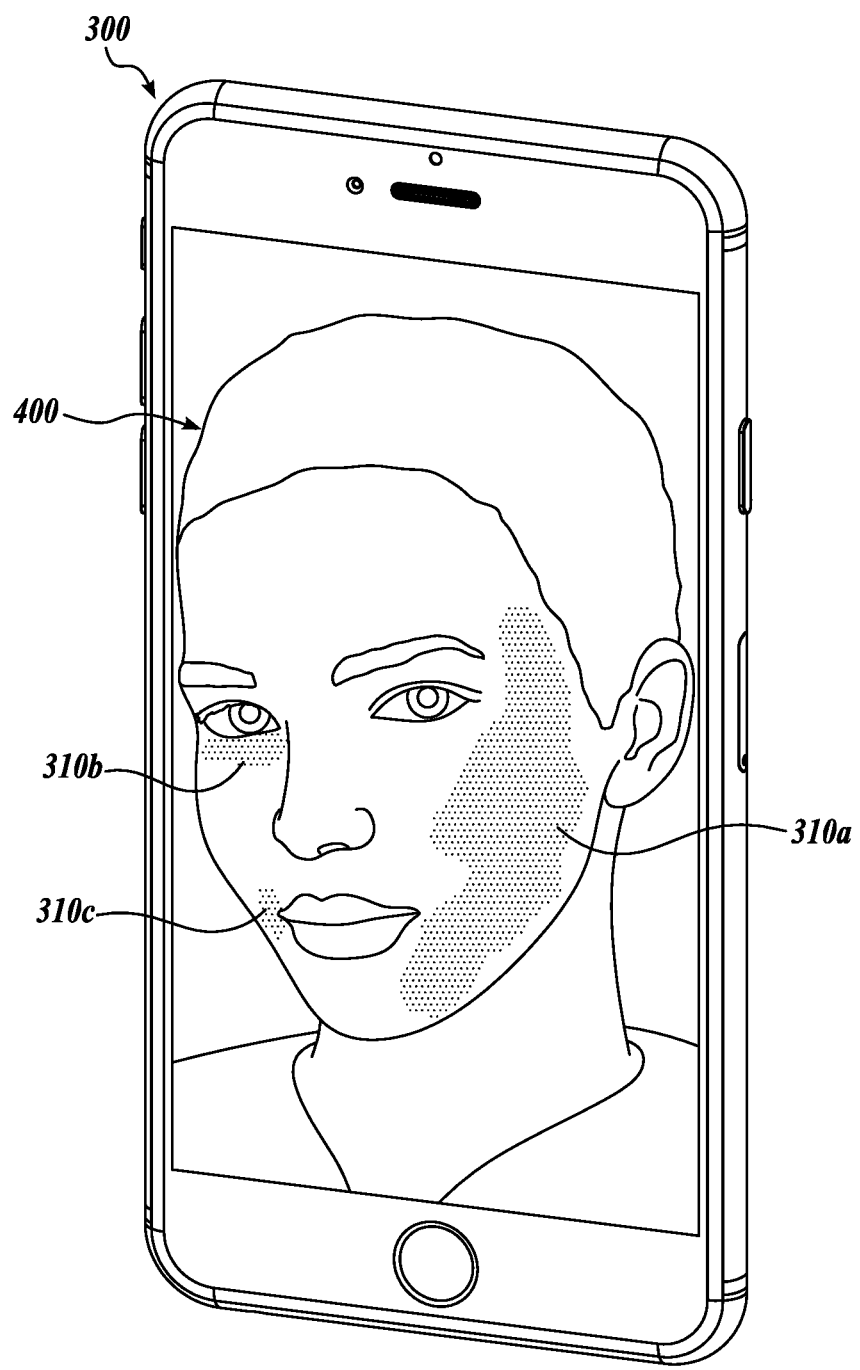
FIG. 5 is an example interface on an example communication device, in accordance with the present technology.

FIG. 5 is an example interface on an example communication device 300, in accordance with the present technology. In some embodiments, the communication device 300 further includes an application configured to visualize a surface 400 while a user applies the light therapy and the formula. As illustrated in FIG. 5, the surface 400 may be a user's face, but in other embodiments, the surface can be any other portion of a user's skin.

In some embodiments, the application highlights one or more areas 310a, 310b, 310c of the surface 400, where the one or more areas 310a, 310b, 310c of the surface are locations where the user has not yet applied the formula and/or locations based on a user history. In some embodiments, the application further directs the user to roll the applicator over the one or more areas 310a, 310b, 310c. In some embodiments, the application, or a cloud-based platform on the communication device 300, is further configured to store a user history, where the user history is each individual time that the user has applied a formula with the applicator.

In operation, the user can hold the communication device 300 or place the communication device 300 in a location that allows the user to see the surface 400, such as a face, with a camera on the communication device. The user may then visualize their face 400 and see one or more areas 310a, 310b, 310c highlighted. In some embodiments, the one or more areas, such as area 310a, are locations where the user has not yet applied the formula. In some embodiments, the application directs the user to apply the formula to these one or more areas 310a, 310b, 310c. In some embodiments, the application directs the user to apply the formula on its own, but in other embodiments, the application directs the user to apply the formula along with the plurality of light sources on the dispenser, as described in FIGS. 3A-3C. In some embodiments, the one or more areas 310a, 310b, 310c may be based on the user history. For example, the one or more areas 310a, 310b, 310c may be a skin feature such as a wrinkle, a fine line, acne, or hyper pigmentation. In some embodiments, the application may alert the user as to changes in the one or more areas 310a, 310b, 310c, such as reduction of a wrinkle over time. In some embodiments, the areas 310 are removed or un-highlighted as the user applies the formula with the dispensing device.

Figure 6:
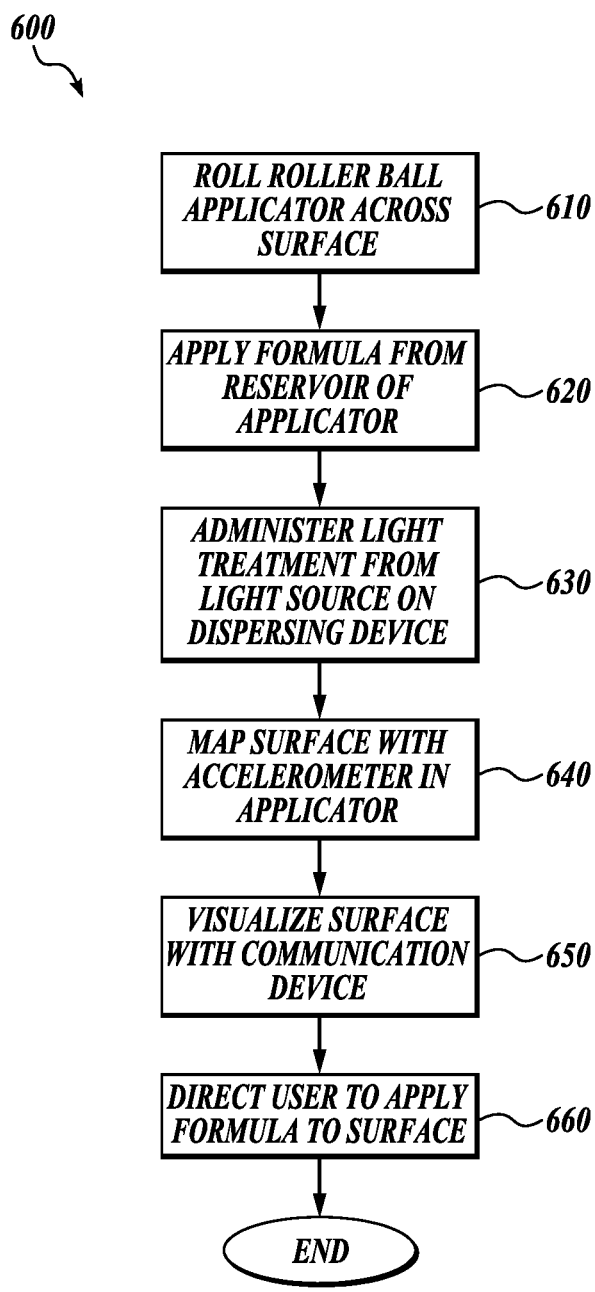
FIG. 6 is an example method of using a skin care system, in accordance with the present technology.

FIG. 6 is an example method 600 of using a skin care system, in accordance with the present technology. In some embodiments, one or more of the steps may be taken by the communication device, the dispensing device, or both.

In block 610, the roller ball applicator is rolled across a surface. In some embodiments, the surface is a human face, but in other embodiments, the surface may be any portion of a user's skin.

In block 620, formula is applied from a reservoir inside the applicator. As the roller ball rolls, it picks up formula from the reservoir and spreads it onto the surface.

In block 630, the dispensing device administers a light treatment with one or more light sources. In some embodiments, the dispensing device may be configured to administer one or more light therapies. In some embodiments, one or more light sources on the dispensing device are configured to administer a first light therapy at a first wavelength, and one or more light source are configured to administer a second light therapy at a second wavelength. In some embodiments, the first light therapy and the second light therapy are administered consecutively, but in other embodiments, the first and second light therapy are administered concurrently. In some embodiments, blocks 610, 620, and 630 happen simultaneously.

In block 640, an accelerometer in the applicator maps the surface as the roller ball rolls. In some embodiments, the accelerometer is a 9-axis accelerometer. As the roller ball rolls, the accelerometer tracks the location of the roller ball on the surface.

Optionally, in block 650, a communication device is used to visualize the surface. In some embodiments, the user can use a camera on the communication device to visualize the surface, such as the user's face. In other embodiments, the surface may be an illustration on the communication device based on the location data collected by the accelerometer, such as an illustration of a human face. In some embodiments, the application on the communication device highlights one or more areas on the surface or the illustrated representation of the surface. In some embodiments, these one or more areas are areas that the user has historically applied the formula. In some embodiments, these one or more areas are locations where the user has not yet applied the formula.

In block 660, the application, the dispensing device, or both direct the user to apply the formula to the surface. In some embodiments, the application on the communication device directs the user to apply the formula by keeping the one or more areas on the surface highlighted until the formula has been applied. In some embodiments, the application directs the user to apply the formula by issuing a notification, tone, or vibration. In some embodiments, the dispensing device directs the user to apply the formula in a specific direction. In some embodiments, the one or more light sources on the base of the dispensing device light up to indicate to the user which direction they should move the applicator. In some embodiments, the one or more light sources on the base of the dispensing device light up based on the accelerometer and point in a direction that the device has not yet been rolled. In other embodiments, the light sources point in a direction that the user has historically applied the formula.

In block 670, the method ends.

The embodiments of the invention in which an exclusive property or privilege is claimed are defined as follows:

1. A system for applying a formula, the system comprising: an applicator comprising: a reservoir configured to hold a formula, a roller ball configured to apply the formula, and an accelerometer configured to map a surface as the roller ball rolls and applies the formula; an attachment configured to couple the applicator to a dispensing device; and a dispensing device comprising: a light source configured to apply light treatment, wherein the dispensing device is configured to accept the applicator; the accelerometer comprises a 9-axis accelerometer.

2. The system of claim 1, wherein the system further comprises a communication device.

3. The system of claim 2, wherein the communication device comprises circuitry configured to:
   visualize the surface;
   highlight one or more areas of the surface, wherein the one or more areas of the surface are locations where the user has not yet applied the formula and/or locations based on a user history;
   direct the user to roll the applicator over the one or more areas; and
   store the user history, wherein the user history is each time the user applies the formula with the applicator.

4. The system of claim 2, wherein the communication device is a smartphone.

5. The system of claim 1, wherein the surface is a user's face.

6. The system of claim 1, wherein the formula is applied simultaneously with the light treatment.

7. The system of claim 1, wherein the light treatment comprises administering two or more wavelengths of light simultaneously.

8. The system of claim 1, wherein the light source comprises a plurality of LEDs.

9. The system of claim 8, wherein the plurality of LEDs is disposed in a ring around an end of the dispensing device.

10. The system of claim 9, wherein the light source is further configured to indicate a direction a user should move the applicator by lighting up one or more of the plurality of LEDs in the direction around the ring.

11. A method of using the skin care system of claim 1, the method comprising:
   rolling a roller ball of an applicator across a surface;
   applying formula from a reservoir in the applicator as the roller ball rolls;
   administering light treatment from a light source on a dispensing device as the roller ball rolls; and
   mapping the surface with an accelerometer in the applicator.

12. The method of claim 11, wherein the method further comprises visualizing the surface with an application on a communication device.

13. The method of claim 11, wherein the surface is a user's face.

14. The method of claim 11, wherein the method further comprises directing the user to roll the applicator in a direction through the light source on the dispensing device.

15. The method of claim 11, wherein the method further comprises:
   visualizing the surface with the communication device; and
   highlighting one or more areas of the surface.

16. The method of claim 15, wherein the one or more areas of the surface are locations where the user has not yet applied the formula.

17. The method of claim 15, wherein the method further comprises directing a user to roll the applicator over the one or more areas of the surface with the application on the communication device.

18. The method of claim 15, wherein the method further comprises storing a user history based on the user using the device and the one or more areas the user rolled the applicator over.

19. The method of claim 15, wherein the method further comprises directing the user to roll the applicator over the one or more areas based on the user history.

* * * * *